(12) United States Patent
Oyama et al.

(10) Patent No.: US 7,093,758 B2
(45) Date of Patent: Aug. 22, 2006

(54) TIRE MARKING SYSTEM

(75) Inventors: Masamichi Oyama, Hiratsuka (JP);
Takehiro Itoh, Tokyo (JP)

(73) Assignee: The Yokohama Rubber Co., Ltd., (JP)

( * ) Notice: Subject to any disclaimer, the term of this patent is extended or adjusted under 35 U.S.C. 154(b) by 0 days.

(21) Appl. No.: 10/751,901

(22) Filed: Jan. 7, 2004

(65) Prior Publication Data
US 2004/0134983 A1 Jul. 15, 2004

(30) Foreign Application Priority Data
Jan. 10, 2003 (JP) .............................. 2003-004671

(51) Int. Cl.
*G06K 7/10* (2006.01)
(52) U.S. Cl. .................. 235/462.01; 235/385; 235/383
(58) Field of Classification Search ........... 235/462.01, 235/385, 445, 454, 487, 383, 435; 156/64; 198/415
See application file for complete search history.

(56) References Cited

U.S. PATENT DOCUMENTS 5,527,407 A * 6/1996 Gartland et al. .............. 156/64
6,149,060 A * 11/2000 Meadows ............... 235/462.01
6,173,892 B1 * 1/2001 Kimijima ..................... 235/385
6,591,966 B1 * 7/2003 Lee et al. .................... 198/415

FOREIGN PATENT DOCUMENTS

JP  2000-84681 A1  3/2000

* cited by examiner

*Primary Examiner*—Steven S. Paik
(74) *Attorney, Agent, or Firm*—Rader, Fishman & Grauer PLLC

(57) ABSTRACT

Disclosed is a tire marking system for marking tire identification information onto tires based on tire information in each of bar code labels adhered to the tires. The tire marking system includes a database server which includes a first database containing data of tire production plan information including tire quantity information and data of tire identification information, and a second database containing data for managing whether marking of the tire identification information is performed onto the tires. The tire marking system further includes client computers connected to the database server via communication media, and a image reading device and a tire marking device which are connected to each of the client computers. When the tire marking device completes the marking, in the second database of the database server, data of the marked tire identification information is updated to indicate that the marking is completed.

10 Claims, 4 Drawing Sheets

TIRE MARKING SYSTEM

BACKGROUND OF THE INVENTION

The present invention relates to a tire marking system, and more specifically, to a tire marking system which facilitates management of tire identification information to be marked on manufactured tires.

In a tire manufacturing process, a bar code label which enables identification of each tire is adhered to a side portion of the tire. Inspection, consolidation and sorting work of the tires, and the like can be facilitated by use of tire information involved in the bar code labels. Moreover, based on the tire information in the bar code labels, it is possible to search for data stored in a database such as manufacture dates, manufacturing persons, forming conditions and inspection conditions.

In recent years, in order to facilitate tire management by customers who have purchased tires, it has been required to provide customer's own tire identification information on the tires. Such customer's own tire identification can not be provided on tires in the tire manufacturing process unlike the bar code labels, as tires that do not meet a quality standard are produced during tire manufacturing. Therefore, customer's own tire identification information needs to be provided on tires which have been manufactured.

A tire marking device is proposed in Japanese Patent Laid-Open No. 2000-84681 as an example of a technique to add tire information after tire manufacturing. This tire marking device forms recessed markings which provide tire information by removing part of a tire surface using a laser beam or the like. Information to be added is retrieved from a database based on information in a bar code label adhered to a tire, and the retrieved information is marked on a side portion of the tire.

However, when the markings of customer's own tire identification information are provided onto tires using a plurality of the above-mentioned tire marking devices, it becomes extremely troublesome and complicated work to accurately form the markings on the respective tires while managing the tire identification information for each customer and each tire size.

SUMMARY OF THE INVENTION

An object of the present invention is to provide a tire marking system capable of facilitating management of tire identification information to be marked on manufactured tires as well as accurately marking the tire identification information onto the respective tires.

In order to achieve the above object, the present invention provides a tire marking system for marking tire identification information onto tires based on tire information in each of bar code labels adhered to the tires, comprising: a database server including a first database containing data of tire production plan information including tire quantity information and of the tire identification information, and a second database containing data for managing whether marking of the tire identification information onto the tire is performed; client computers each connected to the database server through a communication medium; image reading devices each connected to each of the client computers; and tire marking devices each connected to each of the client computers; wherein the bar code label is read by the image reading device, data in the read bar code label is input from the client computer to the database server, the tire identification information is searched in the first database of the database server based on the bar code data, data of the tire identification information retrieved is output to the client computer, the tire identification information is marked by the tire marking device onto the tire whose bar code label has been read, and, in the second database of the database server, data of the marked tire identification information is updated to indicate that the marking is completed.

As described above, the database server includes the second database managing whether the marking of the tire identification information onto the tires has been performed, and when the marking is completed by the tire marking device, the corresponding data is updated to indicate that the marking has been performed. Therefore, it becomes possible to identify the tire identification information marked on the tire based on the updated data. Thus, the tire marking system facilitates the management of the tire identification information to be marked on the manufactured tires and it becomes possible to accurately mark the tire identification information onto the respective manufactured tires.

DETAILED DESCRIPTION OF THE PREFERRED EMBODIMENTS

Figure 1:
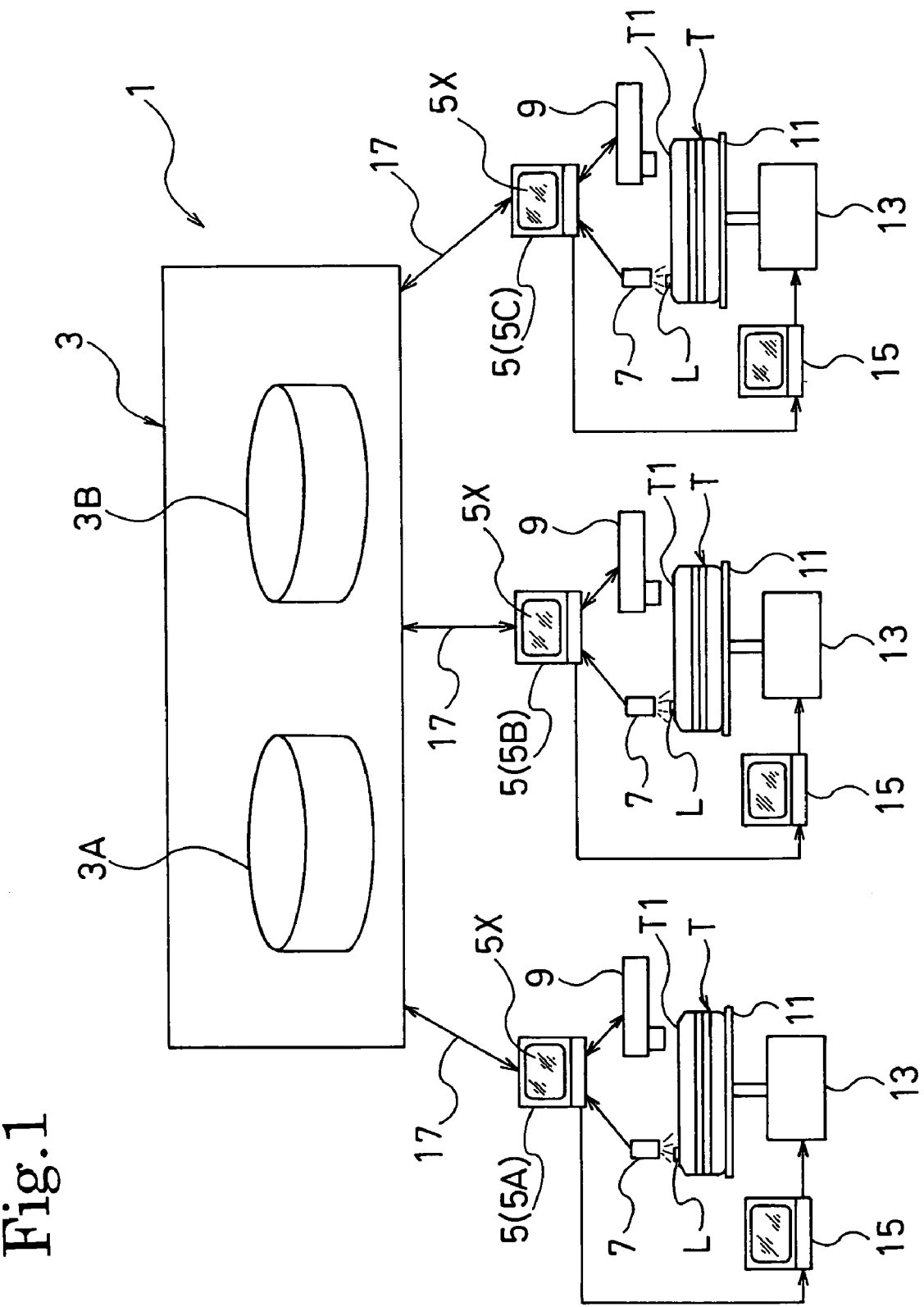
FIG. 1 is a schematic diagram showing an embodiment of a tire marking system according to the present invention.

Referring to FIG. 1, the reference numeral 1 indicates a tire marking system for marking tire identification information on tires T based on the tire information of a bar code on each of a bar code labels L adhered to the tire T. The tire information involved in the bar code label L includes tire size (product number) information and serial number information, and the tires T can be identified by the tire information.

The tire marking system 1 includes a database server 3 and a plurality of client computers 5 each of which is allocated with an address different from those of the other client computers 5. The tire marking system 1 also includes a plurality of image reading devices 7 each of which reads an image of a side portion T1 of the tire T to which the bar code label L is adhered, and a plurality of tire marking devices 9 each of which marks the tire identification information on the side portion T1 of the tire T. Moreover, the tire marking system 1 includes a plurality of placing tables 11 on which a tire T is placed, a plurality of driving devices 13 each of which rotates and raises/lowers the placing table 11, and a plurality of positioning devices 15 each of which controls the driving device 13 to position the tire T placed on the placing table 11 to a location for marking.

The database server 3 includes a first database 3A and a second database 3B. The first database 3A includes: tire production plan information containing quantity information of tires expected to be shipped for each customer and each tire size; tire shipment plan information containing expected shipment dates for each customer and each tire size; tire identification information containing customer's own tire identification information and maker's own tire identification information; and data regarding to position information for marking the tire identification information for each tire size. The second database 3B includes data for managing whether the marking of the tire identification information has been performed on the tire T.

Each client computer 5 is connected to the database server 3 through a communication medium 17 such as a dedicated line or a telephone line. Each client computer 5 having a display unit 5X is connected to each image reading device 7, tire marking device 9 and positioning device 15. The positioning device 15 is connected with the driving device 13.

Each image reading device 7 comprises a CCD camera or the like, and reads an image of the side portion T1 of the tire T including the bar code label L. An image signal of the side portion T1 read by the image reading device 7 is transmitted to the client computer 5.

The client computer 5 processes the image signal of the side portion T1 and transmits the processed data of tire information involved in the bar code label L to the database server 3. In addition, the client computer 5 outputs the processed image data of the side portion T1 to the positioning device 15.

Meanwhile, the database server 3 searches the first database 3A based on the tire information data, and outputs data of retrieved tire identification information and marking position information to the client computer 5.

Figure 2:
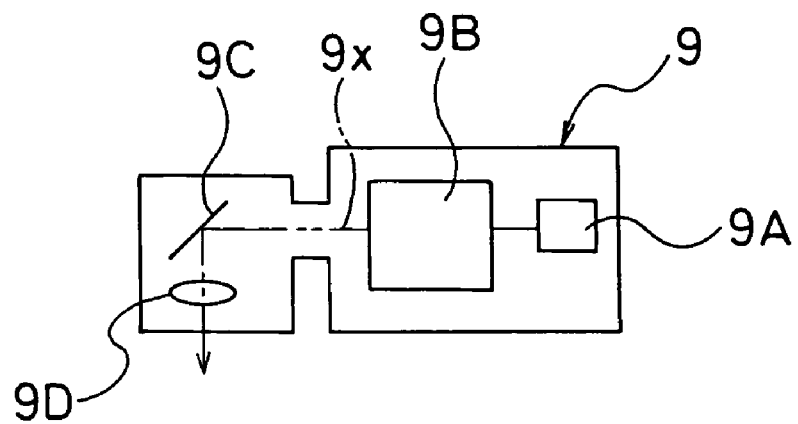
FIG. 2 is a schematic view showing an example of a tire marking device.

As shown in FIG. 2, the tire marking device 9 includes a laser beam source 9A to generate a laser beam such as a YAG laser or a $CO_2$ laser, a light scanning device 9B, a mirror 9C, and a lens 9D. A laser beam 9x emitted from the laser beam source 9A travels through the light scanning device 9B and the direction thereof is changed by 90 degrees by the mirror 9C. Then, the side portion T1 of the tire T is irradiated with the laser beam 9x through the lens 9D, whereby the tire identification information is marked on the side portion T1.

When the marking is completed, the tire marking device 9 transmits a signal to notify the client computer 5 of the completion of the marking. Subsequently, the client computer 5 transmits a marking completion signal to the database server 3. Upon receiving the marking completion signal, the database server 3 updates, in real time, data of the corresponding tire identification information in the second database to indicate that the marking of this tire identification information has been completed.

Figure 3:
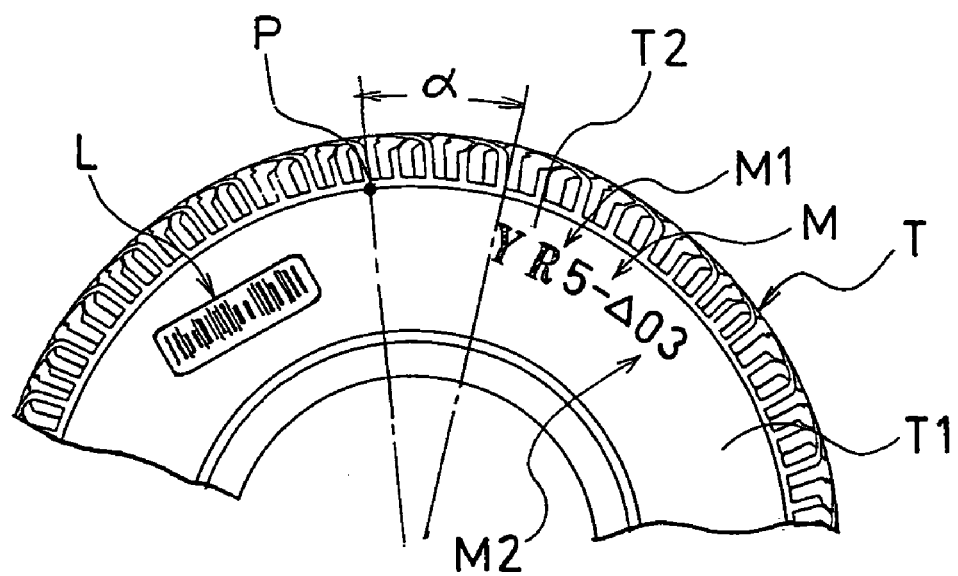
FIG. 3 is a partial side view of a tire onto which a marking has been performed.

The marking M showing the tire identification information may be at least one selected from the following: characters such as an alphanumeric character; figures such as a triangle and a star; and symbols such as an arrow and a hyphen. An example shown in FIG. 3 is a marking M made by combining 2 or more. Here, M1 is maker's own tire identification information, and M2 is customer's own tire identification information.

The positioning device 15 comprises a dedicated computer, and receives the image data of the side portion T1 of the tire T and the marking position information from the client computer 5. As shown in FIG. 3, this position information is data of an angle a from a reference point P to the marking position. The reference point P is formed on the side portion T1 of the tire T in advance. The positioning device 15 identifies the reference point P from the image data of the side portion T1, and controls the driving device 13 so that the tire marking device 9 can start the marking from a position off from the reference point P by the angle á.

The driving device 13 raises or lowers the placing table 11 in order to bring the lens 9D of the tire marking device 9 into focus based on a control signal from the positioning device 15. Further, the driving device 13 rotates the placing table 11 so that the starting position of the marking on the side portion T1 is positioned under the lens 9D.

Figure 4:
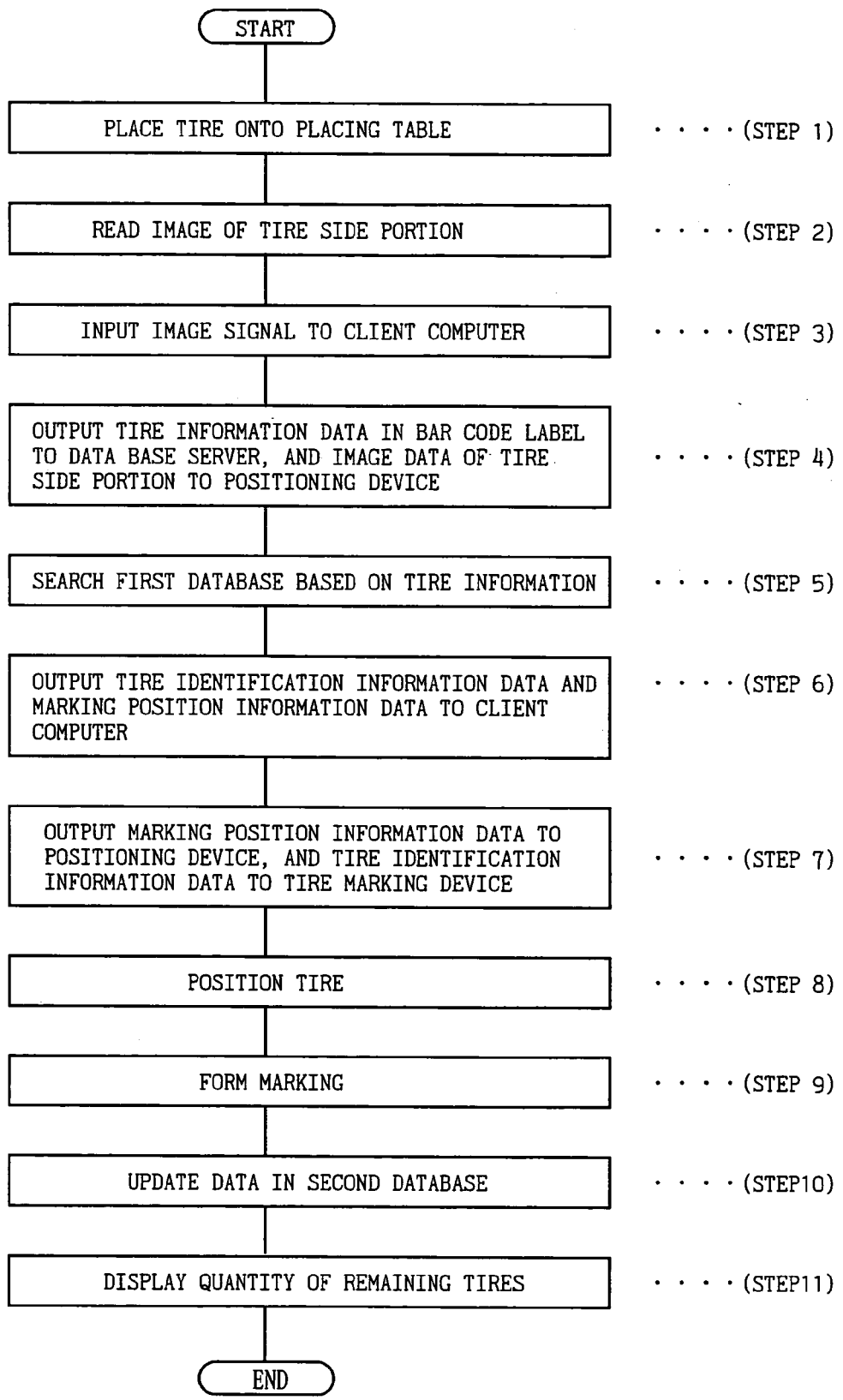
FIG. 4 is a flowchart describing an operation of the tire marking system.

An operation of the tire marking system according to the present invention will be described below with reference to the flowchart of FIG. 4. In order to facilitate understanding, the description will be made assuming that the following information is registered as data in the first database 3A: the tire production plan information indicating that 50 tires with a tire size X1 and 40 tires with a tire size X2 are to be produced for a customer A, and that 20 tires with the tire size X1 and 30 tires with the tire size X2 are to be produced for a customer B; and the tire shipment plan information indicating that the 50 tires with the tire size X1 are to be shipped on the fourth and the 40 tires with the tire size X2 are to be shipped on the tenth of the same month to the customer A, and that the 20 tires with the tire size X1 are to be shipped on the sixth of the same month and the 30 tires with the tire size X2 are to be shipped on the eighth of the same month to the customer B.

First, cured tires T one side portion T1 of which has the bar code label L are conveyed by a conveyor (not shown). Respective operators place each of the tires T onto each placing table 11 (Step 1). Then, the driving devices 13 are operated, and when the placing tables 11 are rotated, the image reading devices 7 are simultaneously turned on to read images of the side portions T including the bar code labels L of the rotating tires T for one rotation or more (Step 2).

An image signal of each side portion T1 read by the respective image reading devices 7 is input to respective client computers 5 (Step 3). The client computer 5 digitalizes and processes the image signal to output the tire information data included in the bar code label L to the database server 3 and to output the image data of the side portion T1 to the positioning device 15 (Step 4).

In the database server 3, the first database 3A is searched based on the input tire information data (Step 5). Here, it is assumed that the tire information data transmitted from the client computer 5A on the left side of FIG. 1 is information indicating that the tire T has the tire size X1. Then, the tire identification information, stored in advance and relating to the tire size X1, of the customer A who has the earliest shipping date with respect to the tires having the tire size X1 in the tire shipment plan information, is primarily searched, and the tire identification information unused is retrieved.

Now it is assumed that the tire information data transmitted from the client computer 5B in the center of FIG. 1 is information indicating that the tire T has the tire size X2. Then, the tire identification information, stored in advance and relating to the tire size X2, of the customer B who has the earliest shipping date with respect to the tires having the tire size X2 in the tire shipment plan information, is primarily searched, and the tire identification information unused is retrieved.

Moreover, it is assumed that the tire information data transmitted from the client computer 5C on the right side of FIG. 1 is information indicating that the tire T has the tire size X1. Then, the tire identification information, stored in advance and relating to the tire size X1, of the customer A who has the earliest shipping date with respect to the tires having the tire size X1 in the tire shipment plan information, is primarily searched, and the tire identification information unused is retrieved.

That is, when information of the tire having the tire size X1 is input from the client computer 5 to the database server 3, the tire identification information, relating to the tire size X1, of the customer A is searched prior to the other tire identification information until the marking onto the 50 tires of the customer A is completed. Further, when information of the tire having the tire size X2 is input from the client computer 5 to the database server 3, the tire identification information, relating to the tire size X2, of the customer B is searched by priority until the marking onto the 40 tires of the customer B is completed.

Meanwhile, in the database server 3, unused tire identification information of the maker managed according to the tire size is retrieved from the first database 3A based on the tire information data. Moreover, the marking position information according to the tire size is retrieved from the first database 3A based on the tire information data.

Subsequently, the retrieved data of tire identification information of the customer and of the maker as well as the marking position information are output from the database server 3 to the client computer 5 with an address from which the tire information data has been sent out (Step 6).

Each client computer 5 outputs the data of the marking position information to the each corresponding positioning device 15, while outputting the data of the tire identification information of the customer and maker to the each corresponding tire marking device 9 (Step 7).

Thereafter, the positioning device 15 determines a starting position of the tire marking based on the position information data and the image data of the side portion T1 of the tire T. Then, the positioning device 15 outputs a control signal to the driving device 13. The driving device 13 rotates and raises/lowers the placing table 11 to fix the position of the tire T to a desired position (Step 8).

After positioning of the tire T, the tire marking device 9 is operated. The tire marking device 9 removes, with the laser beam 9x, rubber in a marking area T2 of the side portion T1 of the tire on the placing table 11 rotating at a low speed. In this way, the recessed marking M providing the tire identification information is formed (Step 9).

When the tire marking device 9 has completed marking, a signal to notify the completion of the marking is input to the database server 3 through the client computer 5. In the database server 3, upon receiving the marking completion signal, the data of the tire identification information of the customer and maker corresponding thereto in the second database 3B is updated in real time to indicate that the data has been used to form the marking M (Step 10). Thus, the tire identification information, which has been used for formation of the marking M, in the first database 3A becomes unable to use, and excluded from searching targets.

In the database server 3, every time the marking completion signal is input from each client computer 5, the data of the tire identification information of the customer and maker corresponding thereto in the second database 3B is updated as described above. Moreover, the quantities of the tires on which the tire identification information has been marked are calculated for each customer and each tire size based on the updated data. Furthermore, the quantities of the remaining tires on which the markings M have not been formed are calculated for each customer and each tire size. Thereafter, the quantity data is output to the respective client computers 5. Then, the quantities of the remaining tires for each customer and each tire size are displayed on the display unit 5X of each client computer 5 (Step 11).

According to the above-described tire marking system of the present invention, the database server 3 includes the second database 3B which manages whether the marking M providing the tire identification information has been formed on the tire T, and when the tire marking device 9 completes forming of the marking M, in the second database 3B, the data is updated to indicate that the marking of the data has been performed. Thus, the tire identification information marked on the tire T can be identified based on the updated data. Consequently, the management of the tire identification information to be marked on the manufactured tires T is facilitated, thereby making it possible to accurately mark the tire identification information on each tire.

Figure 5:
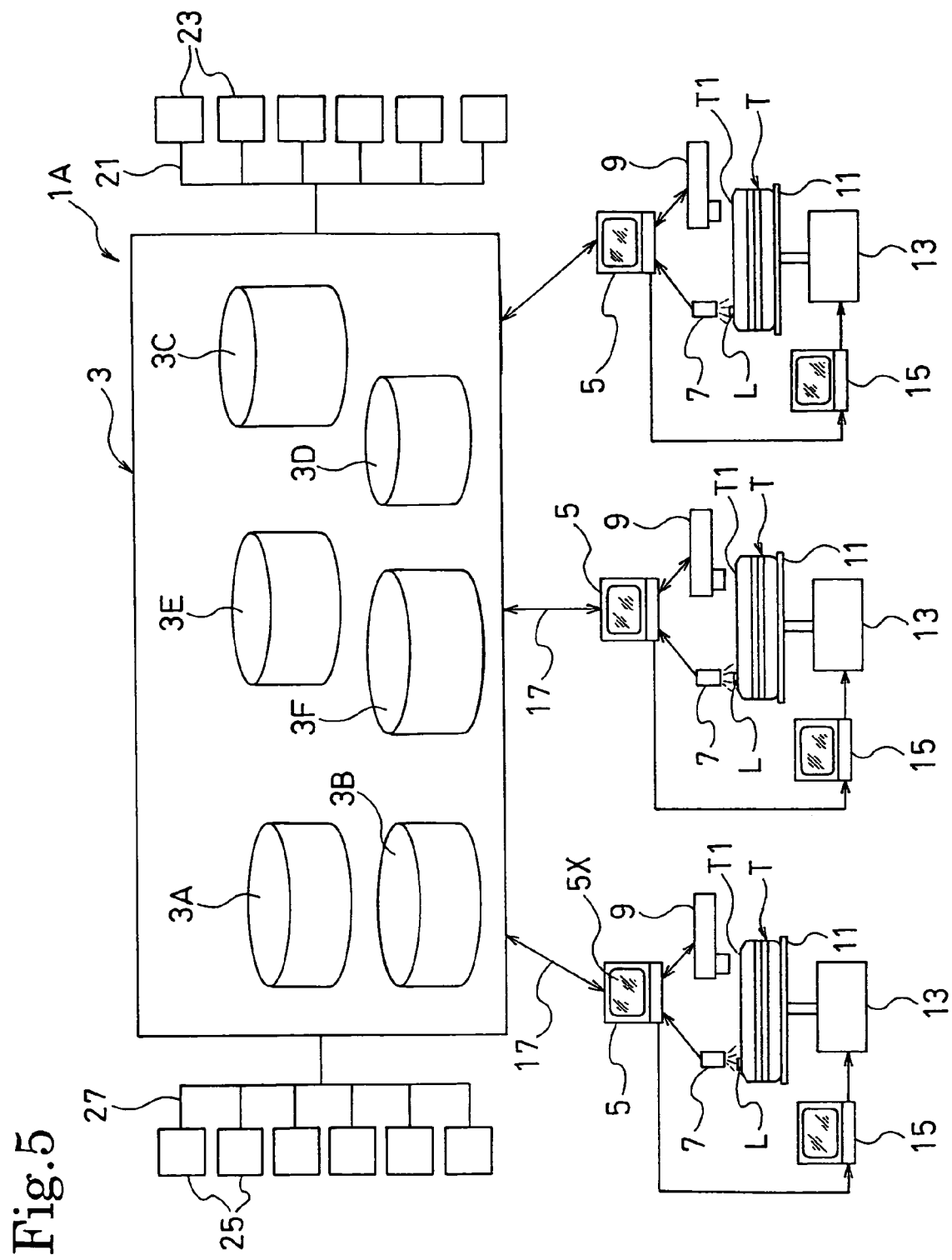
FIG. 5 is a schematic diagram showing another embodiment of the tire marking system of the present invention.

FIG. 5 shows another embodiment of the tire marking system of the present invention. In this tire marking system 1A, the database server 3 includes the following databases in addition to the foregoing first and second databases 3A and 3B: a third database 3C containing data of tire complaint information on complaints from the customers; a fourth database 3D containing data of tire manufacturing information; a fifth database 3E containing data of shipment information on tires which have been shipped; and a sixth database 3F containing data which associates the maker's tire identification information, which has been marked, with the tire information involved in each of the bar code labels L. In this way, data which has been conventionally managed separately by different database devices is incorporated into the database server 3 of the tire marking system 1A.

In the third database 3C, contents of the complaints from the customers are accumulated in the following manner: when a complaint about a tire, which has been sold, has been received from a customer, the contents of the complaint is input into the database server 3 based on the maker's tire identification information (marking M1) from a terminal computer 23 which is installed in a shop, a service company or the like and is connected through a communication medium 21 to the database server 3. The contents of the complaints can be browsed by accessing the third database 3C from terminal computers 25 of the maker or the like through a communication medium 27 based on the tire identification information of the maker.

The fourth database 3D contains data of information concerning the tire manufacturing process. For example, the information indicates tire forming conditions (curing temperature, curing time, etc.), manufacture dates, manufacturing persons, inspection conditions and the like. The above information data is input into the fourth database 3D automatically from each computer (not shown) managing manufacturing lines or by each operator as necessary, and is associated with the tire information in each bar code label L. The fourth database 3D is searched, from the terminal computers 25 or the like, based on the tire identification information of the maker through the tire information in the bar code label L contained in the sixth database 3F, and the tire manufacturing information can be browsed.

The fifth database 3E contains data of the shipment information on the tires already shipped to the customers. For instance, the information indicates customer names, the quantities of consolidated tires for each tire size, shipment dates, shipment routes and the like. The information data is input from the terminal computers 25 of the maker by operators based on the tire information in each bar code label L. The fifth database 3E can be similarly searched, from the terminal computers 25 or the like, based on the tire identification information of the maker through the tire information in the bar code label L contained in the sixth database 3F, and the tire shipment information can be browsed.

As described above, the database server 3 of the tire marking system 1A further incorporates: the third database 3C containing the data of the tire complaint information on the complaints from the customers; the fourth database 3D containing the data of the tire manufacturing information; and the fifth database 3E containing the data of the shipment information on the shipped tires. Therefore, a centralized control and a production control of tires can be efficiently performed in the tire marking system 1A.

According to the present invention, in the drawings of the foregoing embodiments, three client computers 5 and the related devices whose quantities correspond to the quantity of the client computers are shown. However, the quantities of the client computers 5 and the related devices are not limited to the above, and can be set as appropriate when necessary.

The client computers 5 and the related devices may be installed in a same plant. Alternatively, each client computer 5 or each group of client computers 5 and the related devices may be separately installed in different plants at different locations, each client computer 5 or each group of client computers 5 being connected to the database server 3 through the communication media 17.

The present invention can be suitably used for the management of the tire identification information of the customers and maker to be marked on the tires T which have been manufactured. However, the use of the present invention is not limited to this. The present invention can also be suitably used for the management of other tire identification information.

What is claimed is:

1. A tire marking system for marking tire identification information onto tires based on tire information in each of bar code labels adhered to the tires, comprising:
   a database server including a first database containing data of tire production plan information including tire quantity information and datasets of tire identification information associated with at least one customer, and a second database containing data containing information whether marking of a dataset of the tire identification information onto the tire is performed;
   client computers each connected to the database server through a communication medium;
   image reading devices each connected to each of the client computers for reading the bar code labels adhered to the tires; and
   tire marking devices each connected to each of the client computers,
   wherein:
   one of said client computers is adapted to input bar code data in the read bar code label of a tire to the database server,
   the database server is adapted to search a dataset of tire identification information in the first database based on the bar code data, to retrieve the dataset of the tire identification information and to output the dataset of the tire identification information to the client computer,
   the tire marking device is adapted to mark the dataset of the tire identification information onto the tire whose bar code label has been read, and,
   the database server is adapted to update in the second database, the dataset of the identification information of the marked tire to indicate that the marking is completed.

2. The tire marking system according to claim 1, wherein the tire marking device transmits a marking completion signal to the database server through any of said client computers when the marking is completed, and the database server updates, upon receiving the marking completion signal, the dataset of the tire identification information marked onto the tire in the second database to indicate that the marking is completed.

3. The tire marking system according to claim 1, wherein the tire information in the bar code label is tire size information, the tire quantity information is tire quantity information for each tire size, and the tire identification information is tire identification information for each tire size.

4. The tire marking system according to claim 1, wherein the tire quantity information is tire quantity information on a tire expected to be shipped for the at least one customer, and the tire identification information is the at least one customer's own tire identification information.

5. The tire marking system according to claim 1, wherein the tire information in the bar code label is tire size information, the tire quantity information is tire quantity information on a tire expected to be shipped for each of the at least one customer and each tire size, and the tire identification information is the at least one customer's own tire identification information relating to each tire size.

6. The tire marking system according to claim 5, wherein the first database contains data of tire shipment plan information including an expected shipment date for each of the at least one customer and each tire size, and the tire identification information of a customer who has the earliest shipping date according to the data of the expected shipment date retrieved first in the first database.

7. The tire marking system according to claim 1, wherein the tire identification information is tire identification information of a maker.

8. The tire marking system according to claim 7, wherein the database server includes a third database containing data of tire complaint information on a complaint from the at least one customer, a fourth database containing data of tire manufacturing information, and a fifth database containing data of shipment information on shipped tires, and the third, fourth and fifth databases can be searched from a terminal computer based on the tire identification information marked on the tires.

9. The tire marking system according to claim 1, wherein the marking of the tire identification information includes at least one selected from characters, figures and symbols.

10. The tire marking system according to claim 1, wherein, in the database server, the quantity of the tires onto which the marking has been performed is calculated based on the updated data, the quantity of a remaining tire onto which the marking is to be performed is calculated based on the calculated tire quantity and the tire quantity information, and the quantity of the remaining tire can be displayed on a display unit of the client computer.

* * * * *